No. 877,530.

PATENTED JAN. 28, 1908.

W. V. TURNER.
AIR BRAKE.
APPLICATION FILED APR. 9, 1906.

WITNESSES
Harvey L. Lechner
J. C. Bradley

INVENTOR
Walter V. Turner
by atty
Paul Synnestvedt

UNITED STATES PATENT OFFICE.

WALTER V. TURNER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AIR-BRAKE.

No. 877,530.   Specification of Letters Patent.   Patented Jan. 28, 1908.

Application filed April 9, 1906. Serial No. 310,807.

*To all whom it may concern:*

Be it known that I, WALTER V. TURNER, a citizen of the United States, residing at Wilmerding, in the county of Allegheny and State of Pennsylvania, have invented a certain new and useful Improvement in Air-Brakes, of which the following is a specification.

This invention has reference to an improved system of air brake apparatus employing what is known as a control line in addition to the usual train-pipe line, forming two complete pipe connections throughout the train, the features of this improvement being designed for use in conjunction with an auxiliary reservoir, cylinder, and triple valve of usual or known construction employed under each car, but comprising an addition thereto to be used for supplying the cylinder with air in applications of the brake from the control line as well as from the usual auxiliary reservoir in the manner of the ordinary brake.

One of the objects of this present invention is to economize in the use of air in apparatus of this character which is generally employed in local train service, as for example on elevated railroads, or in suburban work where a great many stops have to be made and considerable quantity of air is used, and also where, as in electric traction work, the compressed air is generated by electrically driven compressors under the cars and stored in reservoirs under the motor cars connected to the said control lines in the manner known in the art.

In order to more fully explain this improvement, reference may be had to the accompanying drawings, wherein the same is shown in preferred form, and in which—

Figure 5 is a sectional view showing the position of the said several parts in the emergency application position, while

Figure 1:
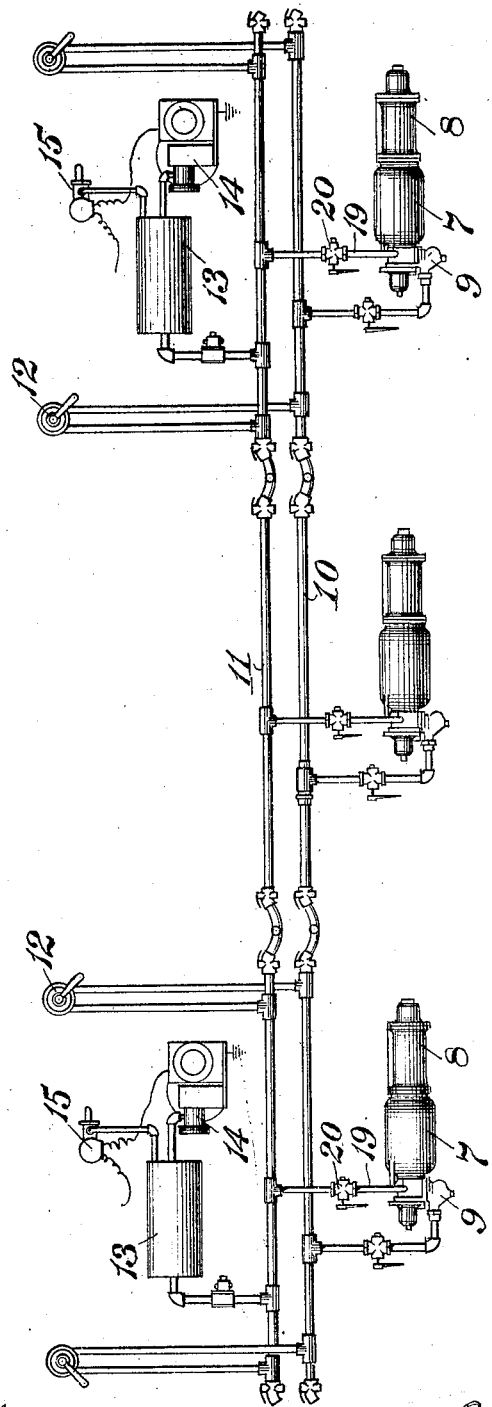
Figure 1 is a diagrammatic representation indicating the equipment of two motor cars complete, with one trailer car, showing the air brake apparatus applied thereto.
Figure 2:
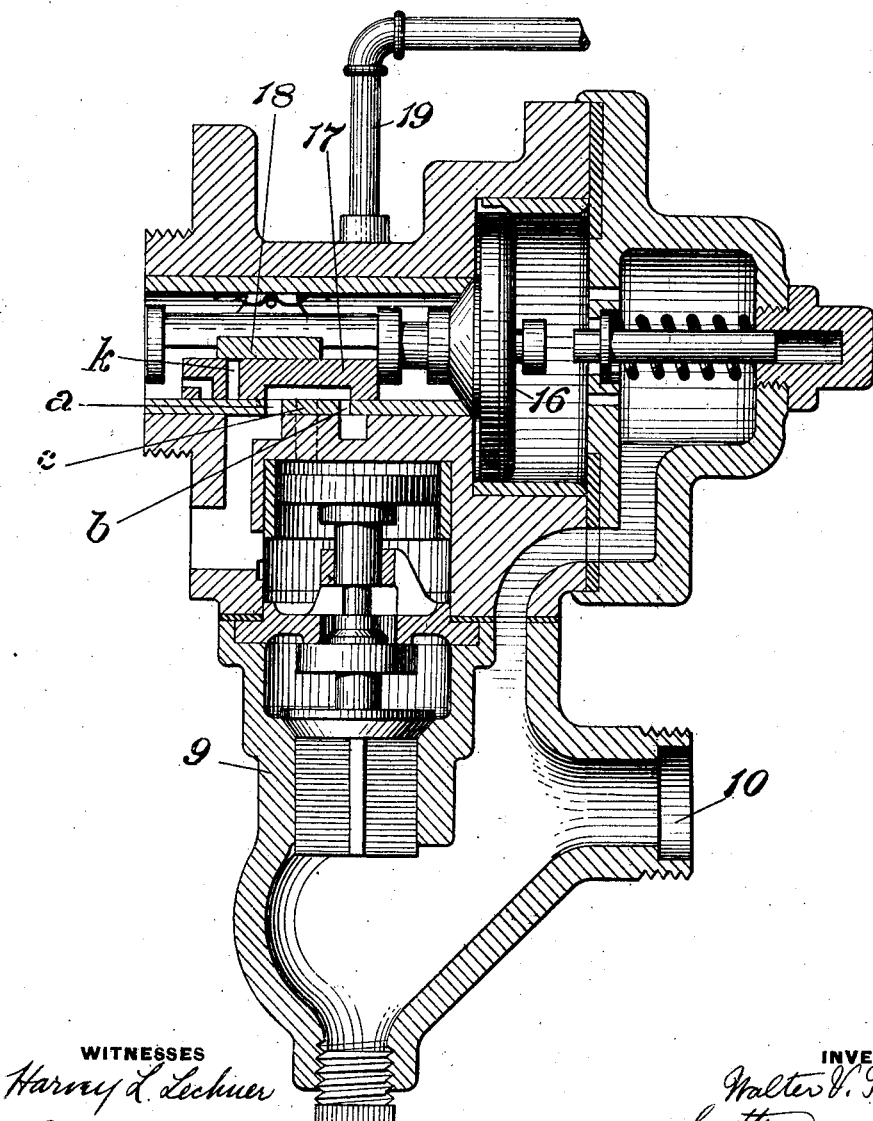
Figure 2 is a sectional view of a quick action triple valve substantially the same as is at present in use in its principal features, but having my improved construction applied thereto.

Referring now more particularly to Figure 1, it will be seen that I have thereon indicated three sets of car apparatus comprising auxiliary reservoir 7, cylinder 8 and triple valve 9, united as is customary in this class of devices, the apparatus forming the group at each extreme end being applied on a motor car and that in the middle applied to what may be called the trailer car, the train-pipe being the pipe marked 10, and the control pipe the part marked 11,—the two pipes being arranged with connections to motorman's valves indicated at 12, and the motor cars being provided with storage or main supply reservoirs 13, electrically driven pumps 14, and the usual pump control or governor apparatus 15, as shown.

By reference more particularly to Figures 2 to 5 inclusive, it will be seen that the triple valve is formed of usual construction, having the quick acting parts in the lower portion, and the main piston 16 attached to the main slide valve 17 and graduating slide valve 18, controlling port *a* which leads to the brake cylinder, port *b* which is the exhaust port from the cylinder, and port *c* which allows the air to enter and operate the emergency parts, these port openings in the seat of the valve being substantially the same as in the ordinary type of triple valve.

Figure 6:
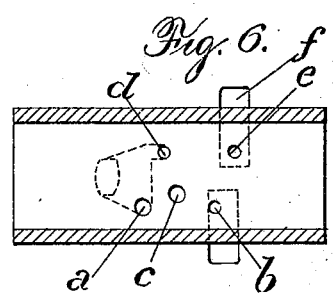
Figure 6 is a plan view of the seat of the triple valve slide valve indicating the several port openings shown in the other views.

Arranged in a line parallel with the said port openings *a*, *b* and *c*, the seat of the valve has another set of port openings marked respectively *d* and *e*, as indicated in Figure 6, the last mentioned set of port openings being designed to supply the air admitted from the control pipe to the brake cylinder in applications of the brake, in accordance with the operation to be more particularly described. It will be observed that the passage *f*, which is formed within the triple valve casing and with which the port *e* communicates, leads around the bushing of the triple valve casing and connects by means of the pipe 19 with the control pipe 11, so as to supply air from the said control pipe in the applications of the brake,—the pipe 19 being also provided with the cutoff or stop cock 20 for use when occasion requires.

Figure 3:
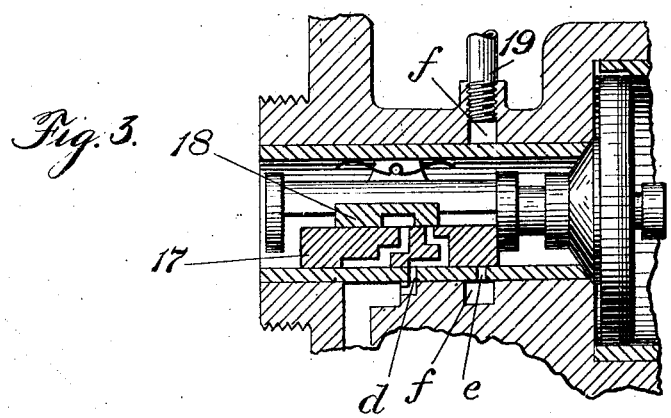
Figure 3 is another sectional view of the said triple valve, showing certain of the port openings in the release position.
Figure 4:
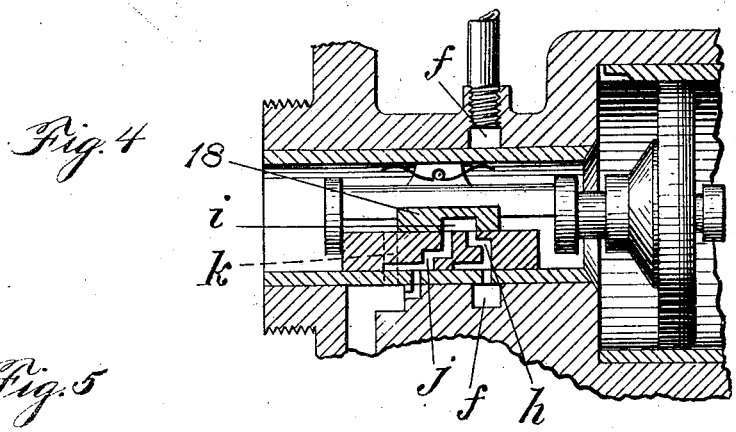
Figure 4 is a view showing the position of the said triple valve parts in the service position.

So far as concerns the operation of the devices above described, in ordinary applications of the brake,—that is, in supplying air from the reservoir to the cylinder and exhausting the air from the cylinder to the atmosphere, the action of the ports $a$, $b$ and $c$, and the co-operating slide valves 17 and 18, is substantially the same as is already known in the art. The action of the port openings $d$ and $e$ will now be more particularly described in conjunction with Figures 3 to 6 inclusive. Figure 3, which indicates the release position of the parts, shows that the passage from the port $e$ to the port $d$ is closed, from which it appears that in the release position there is no flow from the control pipe to the auxiliary reservoir. In the service application, which is indicated in Figure 4, the port $e$ is placed in communication with the port $d$, however, by means of the ports $h$, $i$, $j$, of the two slide valves permitting air to flow in the application of the brake, from the control pipe directly to the brake cylinder at the same time that air is flowing down through the passage $k$ from the auxiliary reservoir to the brake cylinder, thus augmenting the reservoir pressure and requiring less reduction in the reservoir pressure, or making it possible—to put it another way—to use a smaller reservoir to accomplish the same amount or force of brake application by virtue of the utilization of certain pressure in the control pipe.

Figure 5:
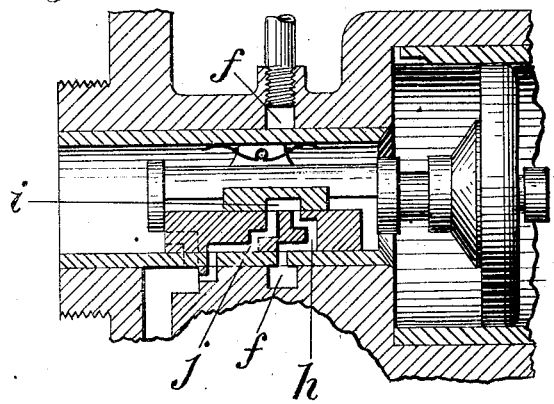

In making emergency applications of the brakes, as shown in Figure 5, the arrangement of the ports $h$, $i$ and $j$ of the two slide valves is such as still maintains the communication from the port $e$ to the port $d$, thus still augmenting the reservoir pressure in procuring application of the brakes, the pressure from the auxiliary reservoir and from the control pipe entering the brake cylinder after the train-pipe pressure has been admitted in the usual manner by the quick action application.

Thus it will be seen that in carrying out my invention I provide means whereby the brake cylinder pressure may be augmented by the pressure of the control pipe, in both emergency and service applications of the brakes, and require the use of a smaller auxiliary reservoir, and will produce therefore some saving effect on the pump, which is required to keep the reservoir charged,—there being always sufficient quantity of air in the control pipe to meet the requirements.

I arrange the proportion of the port openings so that there is just sufficient reduction in the auxiliary reservoir to produce the requisite movements of the triple valve in the usual graduation action of the train, as will be apparent to those skilled in the art, without further description.

By this improvement, as will be observed, it is possible to use an auxiliary reservoir of the same capacity in conjunction with various different sizes of cylinders, or by properly proportioning the port openings from the reservoir it is obvious that various reductions of reservoir pressure can be obtained in graduation application, such as may be required to secure prompt graduation.

It is further to be observed that in conjunction with this improvement the control of the control line ports is subject to the graduating valve as well as to the main slide valve, and therefore when the graduating valve moves it graduates the flow of air not only from the auxiliary reservoir, but also from the control pipe.

Having thus described my invention and illustrated its use, what I claim as new and desire to secure by Letters Patent, is the following:

1. An air brake apparatus comprising in combination a train-pipe, a cylinder, an auxiliary reservoir, a triple valve, a control pipe, and means whereby to establish communication from the control pipe to the cylinder through the triple valve, for augmenting the cylinder pressure from the control pipe in applications of the brake.

2. An air brake mechanism comprising in combination a brake cylinder, a train-pipe, an auxiliary reservoir, a control pipe, and a triple valve constructed to simultaneously admit pressure to the brake cylinder from the auxiliary reservoir and from the control pipe.

3. A brake mechanism comprising in combination a train-pipe, a cylinder, an auxiliary reservoir, a control pipe, and a triple valve constructed to simultaneously admit pressure to the brake cylinder from the train-pipe, auxiliary reservoir and control pipe.

In testimony whereof I have hereunto signed my name in the presence of the two subscribed witnesses.

WALTER V. TURNER.

Witnesses:
J. C. BRADLEY,
F. E. GAITHER.